(12) United States Patent
Sagong et al.

(10) Patent No.: US 11,367,213 B2
(45) Date of Patent: *Jun. 21, 2022

(54) METHOD AND APPARATUS WITH LOCATION ESTIMATION

(71) Applicant: Samsung Electronics Co., Ltd., Suwon-si (KR)

(72) Inventors: Donghoon Sagong, Suwon-si (KR); Hyun Sung Chang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/785,757

(22) Filed: Feb. 10, 2020

(65) Prior Publication Data
US 2021/0090285 A1    Mar. 25, 2021

(30) Foreign Application Priority Data

Sep. 20, 2019  (KR) .................. 10-2019-0115939

(51) Int. Cl.
*G06T 7/73*     (2017.01)
*G06T 7/13*     (2017.01)
*G06T 11/00*    (2006.01)

(52) U.S. Cl.
CPC .............. *G06T 7/73* (2017.01); *G06T 7/13* (2017.01); *G06T 11/00* (2013.01); *G06T 2207/20084* (2013.01); *G06T 2207/30252* (2013.01)

(58) Field of Classification Search
CPC .... G06T 7/13; G06T 7/70; G06T 7/73; G06T 7/536; G06T 2207/20081; G06T 2207/20084; G06T 2207/30241; G06T 2207/30236; G06T 2207/30252; G06T 2207/30256; G06T 11/00; G06T 2207/10004; G06T 2207/30244;
(Continued)

(56) References Cited

U.S. PATENT DOCUMENTS 6,674,434 B1 * 1/2004 Chojnacki .............. G01C 21/32
                                                    345/428
9,430,840 B1   8/2016 Tian et al.
(Continued)

FOREIGN PATENT DOCUMENTS

JP    2010151598 A  *  7/2010
JP    2012-3604 A      1/2012
(Continued)

OTHER PUBLICATIONS

Nan, Zhixiong et al., "Efficient Lane Boundary Detection with Spatial-Temporal Knowledge Filtering", *Sensors*, 2016, 16(8), 1276 (pp. 1-19).
(Continued)

*Primary Examiner* — Chante E Harrison
(74) *Attorney, Agent, or Firm* — NSIP Law

(57) ABSTRACT

A processor implemented method includes: calculating edge direction information of edge component pixels extracted from an input image; determining an inlier pixel among the edge component pixels based on the edge direction information and virtual horizontal line information; estimating a rotation reference point based on the inlier pixel; and correcting localization information of the apparatus based on the estimated rotation reference point.

42 Claims, 14 Drawing Sheets

(58) Field of Classification Search
CPC ........... G06K 9/00791; G06K 9/00798; G06K 9/6271; G06V 10/44; G06V 10/454; G06V 20/588; G01C 21/18; G01C 21/165; G01C 21/3602; G01S 19/42; G01S 19/53; G06N 3/08; G06N 3/0454
See application file for complete search history.

(56) References Cited

U.S. PATENT DOCUMENTS

| | | |
|---|---|---|
| 2013/0266175 A1 | 10/2013 | Zhang et al. |
| 2014/0050359 A1 | 2/2014 | Takahashi |
| 2017/0169300 A1 | 6/2017 | Heisele et al. |
| 2018/0283892 A1 | 10/2018 | Behrendt et al. |
| 2019/0034740 A1* | 1/2019 | Kwant ................. G06K 9/4671 |
| 2019/0068884 A1* | 2/2019 | Purkait ................. G05D 1/0088 |
| 2020/0125859 A1* | 4/2020 | Sagong ................. G01S 19/40 |
| 2020/0372285 A1* | 11/2020 | Adams ................ G06K 9/00798 |
| 2020/0410703 A1* | 12/2020 | Guo ..................... B60W 50/00 |
| 2021/0264171 A1* | 8/2021 | Sagong .............. G06K 9/00798 |

FOREIGN PATENT DOCUMENTS

| | | |
|---|---|---|
| JP | 2014-10636 A | 1/2014 |
| KR | 10-2010-0052732 A | 5/2010 |
| KR | 10-2015-0146374 A | 12/2015 |
| KR | 10-2016-0031967 A | 3/2016 |
| KR | 10-2016-0059149 A | 5/2016 |
| KR | 10-1958605 B1 | 3/2019 |
| KR | 10-2019-0041150 A | 4/2019 |
| KR | 10-2019-0062184 A | 6/2019 |
| WO | WO 2016/007243 A1 | 1/2016 |

OTHER PUBLICATIONS

Lee, Seokju et al., "VPGNet: Vanishing Point Guided Network for Lane and Road Marking Detection and Recognition", *The IEEE International Conference on Computer Vision (ICCV)*, 2017 (pp. 1947-1955).

Wei, Lijun et al., "Augmenting Vehicle Localization Accuracy with Cameras and 3D Road Infrastructure Database." *European Conference on Computer Vision. Springer, Cham*, 2014 (pp. 194-208).

Extended European Search Report dated Nov. 3, 2020 in counterpart European Patent Application No. 20179895.6 (9 pages in English).

\* cited by examiner

METHOD AND APPARATUS WITH LOCATION ESTIMATION

CROSS-REFERENCE TO RELATED APPLICATIONS

This application claims the benefit under 35 USC § 119(a) of Korean Patent Application No. 10-2019-0115939 filed on Sep. 20, 2019 in the Korean Intellectual Property Office, the entire disclosure of which is incorporated herein by reference for all purposes.

BACKGROUND

1. Field

The following description relates to technologies with location estimation.

2. Description of Related Art

When a vehicle or other object is moving, a navigation system for the vehicle receives radio waves from a satellite belonging to a plurality of global positioning systems (GPSs), and verifies a current location of the vehicle and a speed of the vehicle. The navigation system may calculate a three-dimensional (3D) current location of the vehicle including latitude, longitude and altitude information based on information received from a GPS receiver.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented method includes: calculating edge direction information of edge component pixels extracted from an input image; determining an inlier pixel among the edge component pixels based on the edge direction information and virtual horizontal line information; estimating a rotation reference point based on the inlier pixel; and correcting localization information of an apparatus based on the estimated rotation reference point.

The calculating of the edge direction information may include extracting the edge component pixels by preprocessing the input image.

The extracting of the edge component pixels may include: calculating gradient information for each pixel among pixels included in the input image; and extracting select pixels, among the pixels included in the input image, with gradient information exceeding a threshold, as the edge component pixels.

The calculating of the edge direction information my include masking a portion of the edge component pixels.

The masking of the portion of the edge component pixels may include excluding a pixel on a boundary from among the edge component pixels.

The excluding of the pixel on the boundary may include excluding a pixel corresponding to an area above a virtual horizontal line in the input image.

The excluding of the pixel on the boundary may further include determining the virtual horizontal line in the input image based on a roll parameter and a pitch parameter of a camera sensor that captures the input image.

The calculating of the edge direction information may include determining an edge direction of each of the edge component pixels based on an estimation of an edge direction.

The determining of the edge direction may include: calculating a convolution operation value of each of the edge component pixels using a convolutional neural network (CNN) that includes a respective kernel for each of predetermined angles; and determining an angle value for a kernel, of the respective kernels, corresponding to a highest convolution operation value among convolution operation values calculated for each of the edge component pixels to be the edge direction information.

The determining of the inlier pixel may include maintaining the inlier pixel by removing an outlier pixel among the edge component pixels based on intersection points between a virtual horizontal line and edge lines corresponding to the edge direction information of the edge component pixels.

The maintaining of the inlier pixel may include generating, based on an attention neural network, inlier data from which the outlier pixel is removed.

The maintaining of the inlier pixel may include removing the outlier pixel based on an adjacency level between the intersection points.

The removing of the outlier pixel may include: calculating, for each of the edge component pixels, a reference vector from an intersection point, among the intersection points, between an edge line, among the edge lines, and a virtual horizontal line to a reference point in the input image; and calculating a similarity between the reference vectors based on the adjacency level between the intersection points.

The removing of the outlier pixel may further include removing the outlier pixel by applying the calculated similarity to a vector value obtained by converting the edge direction information and image coordinates of an edge component pixel among the edge component pixels.

The estimating of the rotation reference point may include: performing a line fitting on the inlier pixel; and estimating the rotation reference point based on an edge line according to the line fitting.

The performing of the line fitting may include: converting an image including a plurality of inlier pixels to a bird's eye view image; clustering the plurality of inlier pixels into at least one straight line group based on lines corresponding to the plurality of inlier pixels in the bird's eye view image; and determining the edge line to be an edge line representative of each of the at least one straight line group.

The estimating of the rotation reference point may include determining a point with a minimum distance to an edge line corresponding to the inlier pixel in the input image to be the rotation reference point.

The method may further include: performing a visualization by mapping a virtual content object to display coordinates determined based on final localization information of the apparatus in a display that transfers an external scene to a user. The correcting of the localization information may include correcting either one or both of a location error and a rotation error of the localization information based on the estimated rotation reference point, and generating the final localization information based on a result of the correcting of either one or both of the location error and the rotation error.

The method may further include: obtaining the localization information using a global navigation satellite system (GNSS) module and an inertial measurement unit (IMU); and acquiring the input image using an image sensor.

In another general aspect, a non-transitory computer-readable storage medium stores instructions that, when executed by a processor, cause the processor to perform the method described above.

In another general aspect, an apparatus includes: a sensor configured to acquire an input image; and a processor configured to: calculate edge direction information of edge component pixels extracted from the input image; determine an inlier pixel among the edge component pixels based on the edge direction information and virtual horizontal line information; estimate a rotation reference point based on the inlier pixel; and correct localization information of the apparatus based on the estimated rotation reference point.

The edge component pixels may include select pixels, among the pixels included in the input image, determined to have gradient information exceeding a threshold.

The processor may be further configured to mask a portion of the edge component pixels by excluding a pixel, among the edge component pixels, corresponding to an area above a virtual horizontal line in the input image.

The processor may be further configured to determine the virtual horizontal line based on a roll parameter and a pitch parameter of the sensor.

The processor may be further configured to calculate the edge direction information by implementing a neural network to perform convolution operations on each of the edge component pixels; and determining, based on results of the convolution operations, an angle corresponding to each of the edge component pixels to be the edge direction information.

The processor may be further configured to determine the inlier pixel by removing an outlier pixel among the edge component pixels based on an adjacency level between intersection points between a virtual horizontal line and edge lines corresponding to the edge direction information of the edge component pixels.

The removing of the outlier pixel may include: calculating, for each of the edge component pixels, a reference vector from an intersection point, among the intersection points, between an edge line, among the edge lines, and a virtual horizontal line to a reference point in the input image; calculating a similarity between the reference vectors based on the adjacency level between the intersection points; and removing the outlier pixel by applying the calculated similarity to a vector value obtained by converting the edge direction information and image coordinates of an edge component pixel among the edge component pixels.

The processor may be further configured to determine the inlier pixel by removing an outlier pixel among the edge component pixels based on intersection points between a virtual horizontal line and edge lines corresponding to the edge direction information of the edge component pixels.

The processor may be further configured to determine the inlier pixel by: removing an outlier pixel among the edge component pixels based on intersection points between a virtual horizontal line and edge lines corresponding to the edge direction information of the edge component pixels; and generating, based on an attention neural network, inlier data from which the outlier pixel is removed.

The processor may be further configured to estimate the rotation reference point by: performing a line fitting on the inlier pixel in a bird's eye view image based on the input image; and estimating the rotation reference point based on an edge line according to the line fitting.

The processor may be further configured to estimate the rotation reference point by determining a point with a minimum distance to an edge line corresponding to the inlier pixel in the input image to be the rotation reference point.

The processor may be further configured to perform a visualization by mapping a virtual content object to display coordinates determined based on final localization information of the apparatus in a display that transfers an external scene to a user. The processor may be further configured to correct the localization information by correcting either one or both of a location error and a rotation error of the localization information based on the estimated rotation reference point, and generating the final localization information based on a result of the correcting of either one or both of the location error and the rotation error.

The processor may be further configured to obtain the localization information from a global navigation satellite system (GNSS) module and an inertial measurement unit (IMU).

In another general aspect, an augmented reality (AR) apparatus includes: a display configured to provide a view of an external environment; a sensor configured to acquire an input image; and a processor configured to: calculate edge direction information of edge component pixels extracted from the input image; determine an inlier pixel among the edge component pixels based on the edge direction information and virtual horizontal line information; estimate a rotation reference point based on the inlier pixel; generate final localization information by correcting initial localization information of the apparatus based on the estimated rotation reference point; and perform a visualization by mapping a virtual content object to coordinates of the display determined based on the final localization information.

The sensor may include a global navigation satellite system (GNSS) module and an inertial measurement unit (IMU. The initial localization information may include location information and pose information obtained from the GNSS module and the IMU.

The processor may be further configured to determine an initial rotation reference point based on map data and the initial localization information. The correcting of the initial localization information may include applying a rotation parameter such that the initial rotation reference point matches the estimated rotation reference point.

The processor may be further configured to calculate the edge direction information by: implementing a neural network to perform convolution operations on each of the edge component pixels; and determining, based on results of the convolution operations, an angle corresponding to each of the edge component pixels to be the edge direction information.

The processor may be further configured to estimate the rotation reference point by determining a point with a minimum distance to an edge line corresponding to the inlier pixel in the input image to be the rotation reference point.

The processor may be further configured to estimate the rotation reference point by: performing a line fitting on the inlier pixel in a bird's eye view image based on the input image; and estimating the rotation reference point based on an edge line according to the line fitting.

The processor may be further configured to determine the inlier pixel by removing an outlier pixel among the edge component pixels based on an adjacency level between intersection points between a virtual horizontal line and edge lines corresponding to the edge direction information of the edge component pixels.

The processor may be further configured to determine the inlier pixel by: removing an outlier pixel among the edge component pixels based on intersection points between a virtual horizontal line and edge lines corresponding to the edge direction information of the edge component pixels; and generating, based on an attention neural network, inlier data from which the outlier pixel is removed.

The display may include a windshield of a vehicle.

Other features and aspects will be apparent from the following detailed description, the drawings, and the claims.

Figure 1:
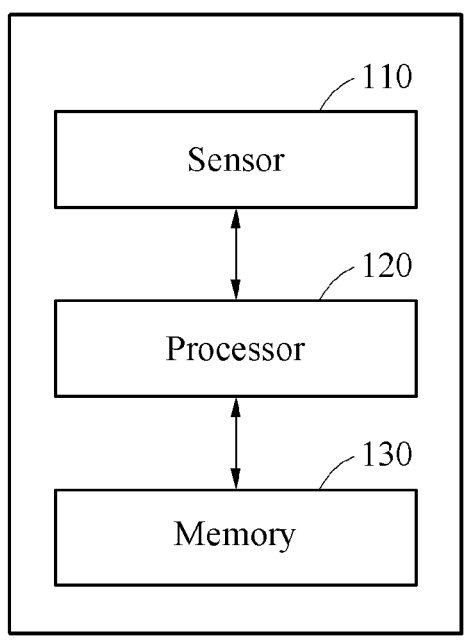
FIG. 1 is a block diagram illustrating an example of a location estimation apparatus.

Throughout the drawings and the detailed description, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto. Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

For example, global positioning system (GPS) signals for estimating the location of a target, for example, a moving object, such as a vehicle, may include a GPS location error of about 10 meters (m) to 100 m. According to example embodiments disclosed herein, such a location error may be corrected based on other information.

FIG. 1 is a block diagram illustrating an example of a location estimation apparatus.

Referring to FIG. 1, a location estimation apparatus 100 may include, for example, a sensor 110, a processor 120, and a memory 130.

The sensor 110 generates sensing data. For example, the sensor 110 generates sensing data by sensing information used for estimating a location of a target. The target is, for example, an object of which a pose and a location are estimated by the location estimation apparatus 100. In an example, the target may be the location estimation apparatus 100. In another example, the location estimation apparatus 100 may be mounted on a vehicle and the target may be the vehicle. The information used for estimating a location includes various signals, for example, a global navigation satellite system (GNSS) signal (for example, a global positioning system (GPS) signal), an acceleration signal, a velocity signal, and an image signal. The processor 120 primarily measures initial localization information based on the sensing data. The initial localization information includes information indicating a location and a pose of the target measured coarsely. For example, the sensor 110 may include an inertial measurement unit (IMU) and a GNSS module. In such an example, the sensor 110 acquires an IMU signal and GNSS signals indicating an acceleration and an angular velocity of the target as the sensing data.

The IMU is also referred to as "inertial measurer". The IMU measures a change in pose, a change speed for location movement, and a displacement. The IMU includes a three-axis accelerometer that senses a translational motion, for example, an acceleration, and a three-axis gyroscope that senses a rotation motion, for example, an angular velocity. Since the IMU does not depend on external information, an acceleration signal and an angular velocity signal may often be stably collected. The GNSS module may receive signals transmitted from at least three artificial satellites to calculate locations of the satellites and the location estimation apparatus 100, and may also be referred to as a GNSS. The GNSS module may measure an absolute location at 1 hertz (Hz) and may stably operate due to relatively low noise of the GNSS module. The IMU may measure a relative location at 100 Hz and perform a measurement at a high speed.

Also, the sensor 110 senses image data. For example, the sensor 110 may include a camera sensor. The camera sensor receives rays in a visible light range and senses an intensity of the light. The camera sensor generates a color image by sensing an intensity of light corresponding to each of a red channel, a blue channel and a green channel. However, a wavelength band that may be sensed by the sensor 110 is not limited to a visible light band. The sensor 110 may further or alternatively include, for example, an infrared sensor that senses rays in an infrared band, a Lidar sensor, a RADAR sensor that senses a signal in an electromagnetic band, a thermal image sensor, or a depth sensor. The camera sensor generates image data by capturing an external view, for example, a front view from the location estimation apparatus 100.

The processor 120 may generate final localization information of a target by correcting initial localization information of the target. The processor 120 may estimate the initial localization information and a rotation reference point to correct a localization error (for example, a rotation error and a location error) between an actual location and a pose of the target. Herein, the rotation reference point is a point used as a reference to correct a rotation error in localization information estimated for the target. The localization information may include information on a location, a pose and a movement, for example, a speed and an acceleration, of the target. The rotation reference point may be used in a localization, and may be used to, for example, correct a localization based on map data.

For example, a first rotation reference point may be a three-dimensional (3D) point corresponding to a vanishing point on a two-dimensional (2D) image plane and may indicate a point sufficiently distanced from an image sensor among points on a lane boundary line. The processor 120 may determine the first rotation reference point based on map data and localization information estimated for the target. A second rotation reference point may be a rotation reference point estimated based on image data sensed by the sensor 110. The second rotation reference point may be, as a kind of a vanishing point, a point to which at least two parallel straight lines (for example, lane boundary lines) converge in a 3D space when the straight lines are projected onto a 2D image plane. The processor 120 may estimate the second rotation reference point from image data associated with a front view of the target.

In the following description of FIGS. 5 through 11, the first rotation reference point is referred to as an "initial reference point", and the second rotation reference point is referred to as a "rotation reference point".

Referring to FIG. 1, the processor 120 corrects localization information (for example, initial localization information) based on a rotation parameter calculated based on the first rotation reference point and the second rotation reference point. The rotation parameter is a parameter to compensate for an error between initially estimated initial localization information and an actual location and a pose of the target, and may be, for example, a parameter to match the first rotation reference point and the second reference point. For example, the camera sensor included in the sensor 110 may be attached to the target, for example, a vehicle, such that the camera sensor has an optical axis parallel to a longitudinal axis of the target. In this example, since the camera sensor makes a same motion as a motion of the target, the image data sensed by the camera sensor includes visual information matching the location and pose of the target. Thus, the processor 120 may apply the rotation parameter so that the first rotation reference point corresponding to the initial localization information matches the second rotation reference point detected from the image data.

The memory 130 temporarily or permanently stores data used to perform a location estimation method. For example, the memory 130 stores a convolutional neural network (CNN) trained for a local filtering from image data and an attention neural network trained for a nonlocal filtering. However, the disclosure is not limited to the memory 130 storing a CNN and an attention neural network. For example, other types of neural networks, such as a recurrent neural network (RNN), a deep belief network, a fully connected network, a bi-directional neural network, a restricted Boltzmann machine, or a neural network including different or overlapping neural network portions respectively with full, convolutional, recurrent, and/or bi-directional connections may be stored on the memory 130 to perform the local filtering and the nonlocal filtering.

As described above, the location estimation apparatus 100 estimates initial localization information including an initial location and an initial pose of the target based on sensing data sensed by the sensor 110. The initial localization information may include a pose error and a location error. An error in the initial localization information will be described in greater detail with reference to FIGS. 2 through 4.

Figure 2:
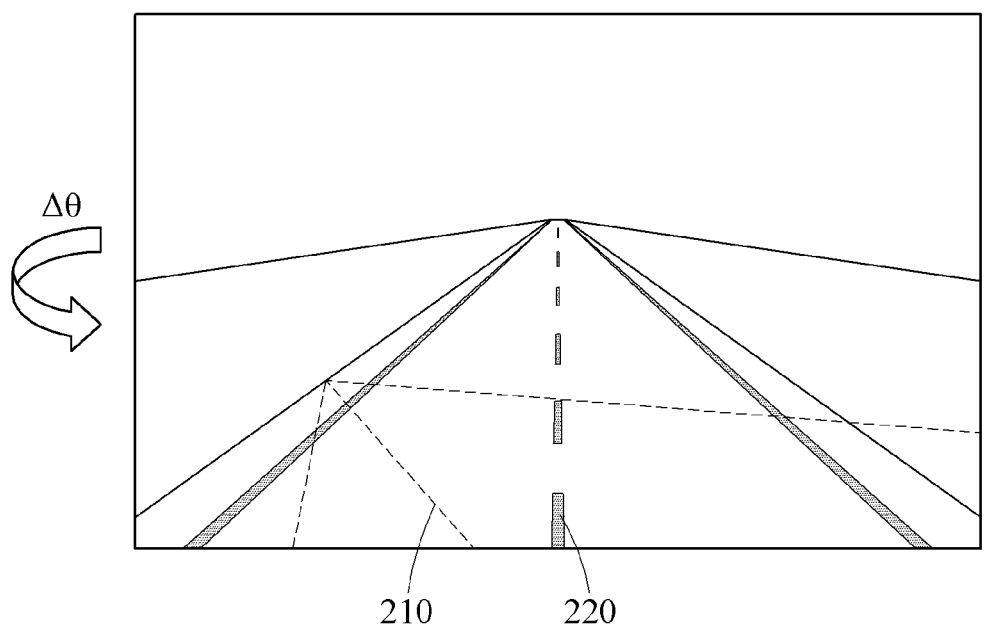
FIGS. 2 through 4 illustrate examples of a location estimation error.
Figure 3:
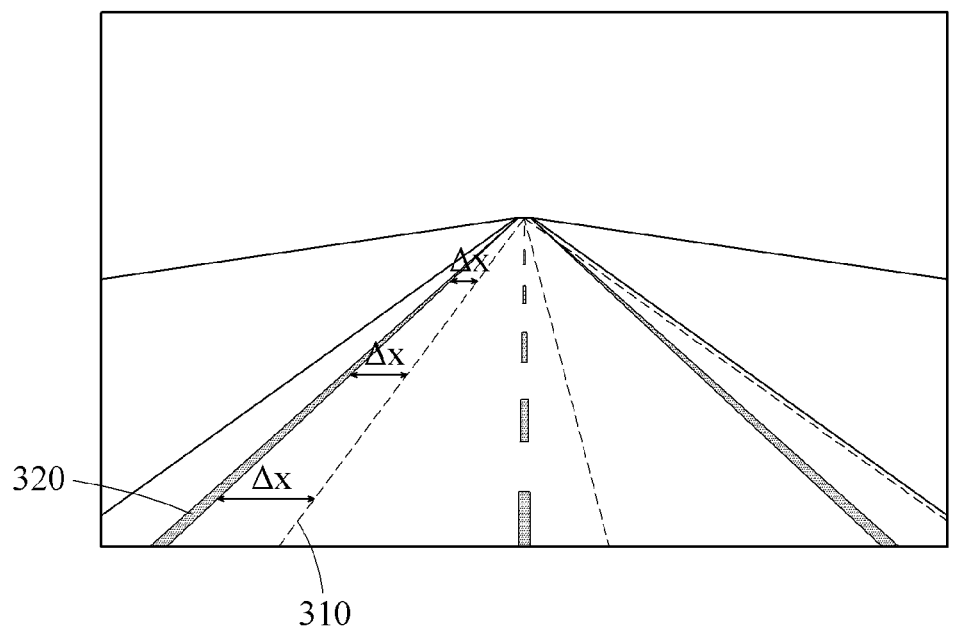
Figure 4:
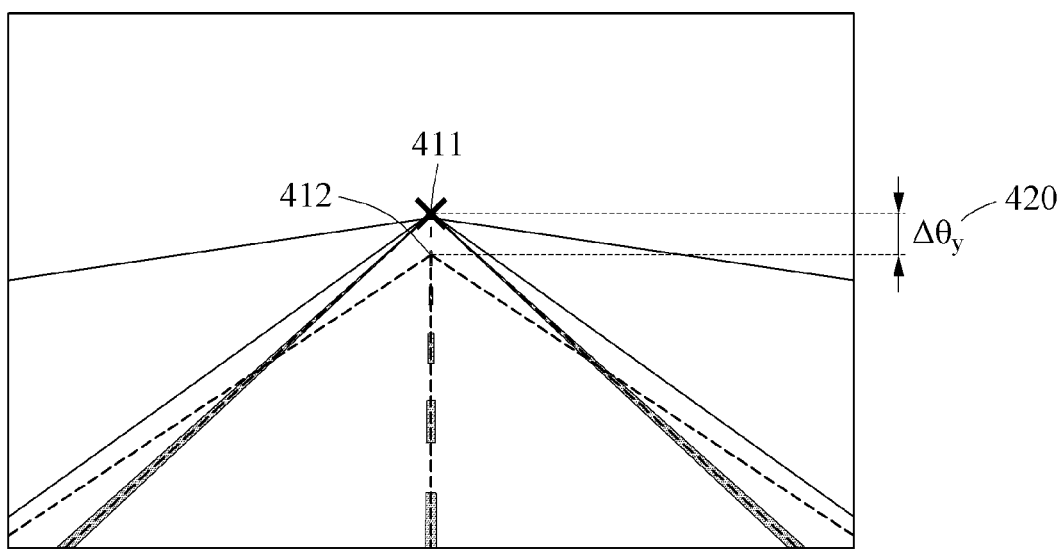

FIGS. 2 through 4 illustrate examples of a location estimation error.

A location estimation apparatus (e.g., the location estimation apparatus 100), according to an example embodiment, measures initial localization information based on a GNSS signal and an acceleration signal, for example. FIG.

2 illustrates a situation in which an initial pose of the initial localization information has a rotation error Δθ with respect to an actual pose. The initial localization information indicates that a target including the location estimation apparatus has an arbitrary initial location and an arbitrary initial pose. Based on map data, for example, a high definition (HD) map, a map lane boundary line 210 corresponding to the initial localization information is as shown in FIG. 2. An image lane boundary line 220 appearing in image data that is actually captured by an image sensor may be at an angle different from that of the map lane boundary line 210. Thus, the location estimation apparatus may compensate for the above-described rotation error based on a rotation parameter.

The map data includes information associated with a map and includes, for example, information on a landmark. The landmark may be, for example, an object fixed at a predetermined geographical location to provide a driver with information used to drive a vehicle on a road. For example, road signs and traffic lights may belong to the landmark. For example, according to the Korean Road Traffic act, landmarks are classified into six classes, for example, a caution sign, a regulatory sign, an indication sign, an auxiliary sign, a road sign, and a signal sign. However, classification of the landmarks is not limited to the above description. Classes of the landmark may differ for each country, for example.

Also, herein, a lane boundary line (e.g., a line corresponding to the map lane boundary line 210 or the image lane boundary line 220) is a line for defining a lane. The land boundary line may be, for example, a solid line or a broken line marked on a road surface, or a curb arranged along an outer edge of a road.

FIG. 3 illustrates an example situation in which an initial location in initial localization information has a horizontal location error Δx with respect to an actual location. Based on map data, a map lane boundary line 310 corresponding to the initial localization information is as shown in FIG. 3. An image lane boundary line 320 appearing in image data that is actually captured by an image sensor may be at a different location from the map lane boundary line 310.

FIG. 4 illustrates an example situation in which an initial pose in initial localization information has a rotation error 420 $\Delta\theta_y$ with respect to an actual pose about a lateral axis. Based on map data, a first rotation reference point 412 corresponding to a map lane boundary line corresponding to the initial localization information is as shown in FIG. 4. A second rotation reference point 411 corresponding to an image lane boundary line appearing in image data that is actually captured by an image sensor corresponds to a different pose from that of the first rotation reference point 412. Thus, the location estimation apparatus (e.g., the location estimation apparatus 100) may compensate for the rotation error 420 $\Delta\theta_y$ based on a rotation parameter.

Figure 5:
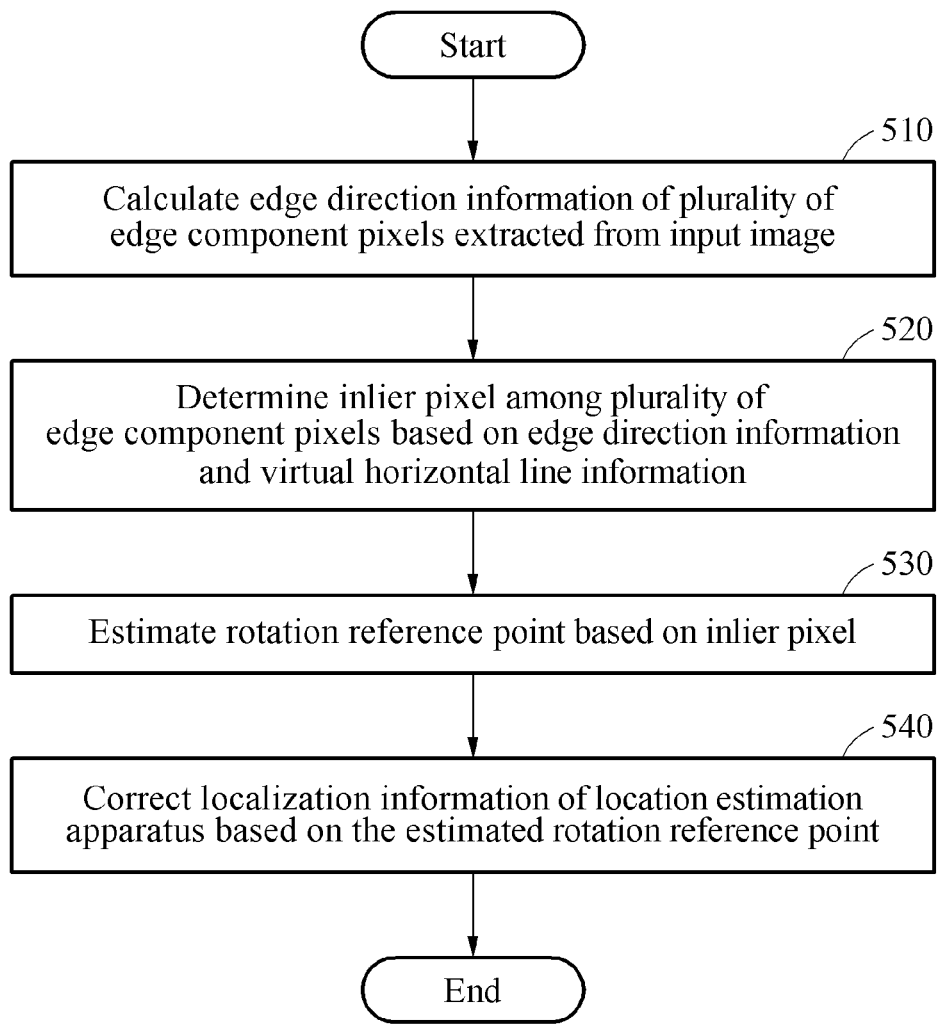
FIG. 5 is a flowchart illustrating an example of a location estimation method.

FIG. 5 is a flowchart illustrating an example of a location estimation method.

Referring to FIG. 5, in operation 510, a location estimation apparatus (e.g., the location estimation apparatus 100), according to an example embodiment, calculates edge direction information of a plurality of edge component pixels extracted from an input image. An edge component pixel is a pixel indicating an edge component in the input image. The edge component pixels will be further described with reference to FIG. 7 below. The edge direction information is information indicating a direction (for example, a 2D direction in an image) in which an edge indicated by an edge component pixel faces. Example edge direction information will be further described with reference to FIG. 9 below.

Although the input image as described herein is a grey scale image obtained by converting a color image, the disclosure is not limited to such an example. The input image may be, for example, a color image. When the location estimation apparatus is included in a vehicle, the input image may be a travelling image representing a front view from the vehicle while the vehicle is travelling. For example, when the input image is an RGB image and has 256 horizontal pixels and 256 vertical pixels, a total value of 256×256×3 pixels may be used as input data.

In operation 520, the location estimation apparatus determines an inlier pixel among the plurality of edge component pixels based on the edge direction information and virtual horizontal line information. The virtual horizontal line information is straight line information corresponding to a horizontal line within an angle of field (or field of view) of a camera sensor as prior information. The virtual horizontal line may be a virtual horizon, a virtual horizontal line including or dependent on a determined estimated vanishing point, or an otherwise determined or pre-set (such as dependent on a pose of the capturing image sensor) virtual line. The virtual horizontal line information will be further described with reference to FIG. 8 below. The inlier pixel is a pixel used to estimate a rotation reference point among the plurality of edge component pixels, and an outlier pixel is one of pixels other than the inlier pixel among the plurality of edge component pixels. For example, the location estimation apparatus may calculate an intersection point between a straight line that is based on the edge direction information and a straight line that is based on the virtual horizontal line information at each of locations of the plurality of edge component pixels, and may determine, as an inlier pixel, pixels forming an intersection point at locations adjacent to each other. Examples of determining an inlier pixel will be further described with reference to FIGS. 10 and 11 below.

In operation 530, the location estimation apparatus estimates a rotation reference point based on the inlier pixel. In an example, the location estimation apparatus may determine a point in an image which has a minimum distance to straight lines corresponding to inlier pixels to be the above-described rotation reference point. In another example, the location estimation apparatus may determine an average point of intersection points between the virtual horizontal line and straight lines that are based on edge direction information of inlier pixels to be the rotation reference point. In another example, the location estimation apparatus may determine an average point of intersection points between straight lines that are based on edge direction information of inlier pixels to be the rotation reference point. However, the disclosure is not limited to the foregoing examples, and the rotation reference point may be determined by various schemes. The rotation reference point may be expressed by 2D coordinates ($r_x$, $r_y$), and $r_x$ and $r_y$ may have values in a range of [0, 1] as relative coordinate values with respect to a size of an image.

In operation 540, the location estimation apparatus corrects localization information of the location estimation apparatus based on the estimated rotation reference point. For example, the location estimation apparatus may estimate initial localization information based on a GNSS signal, an IMU signal and map data, and may also estimate a corresponding initial reference point. The location estimation apparatus may estimate a localization error (for example, a rotation error and a location error) between the initial reference point and the rotation reference point. An error between the initial reference point and the rotation reference point may correspond to an error between an initial pose and an actual pose. Thus, the location estimation apparatus may correct the initial localization information by rotating and/or moving the initial localization information by the localization error, and may generate final localization information. Thus, the location estimation apparatus may determine a more accurate pose from an initial pose estimated to be twisted unlike an actual pose.

Figure 6:
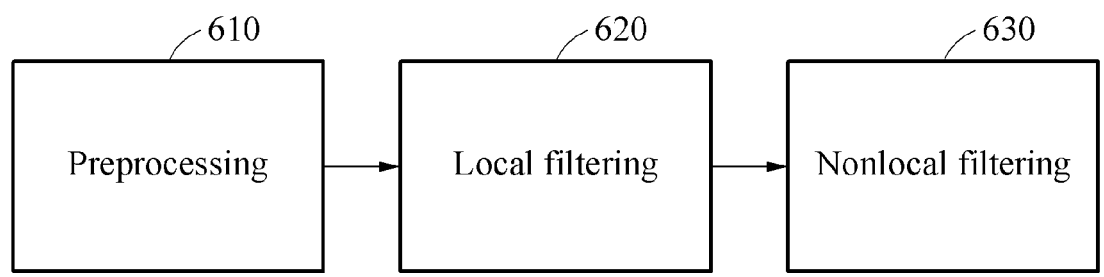
FIG. 6 illustrates an example of a location estimation process.

FIG. 6 illustrates an example of a location estimation process.

Referring to FIG. 6, in operation 610, a location estimation apparatus (e.g., the location estimation apparatus 100), according to an example embodiment, preprocesses an input image. The location estimation apparatus may preprocess the input image to extract edge component pixels. In operation 620, the location estimation apparatus performs a local filtering on edge component pixels, to determine edge direction information for each of the edge component pixels. In operation 630, the location estimation apparatus performs a nonlocal filtering on edge component pixels, to exclude outlier pixels and maintain inlier pixels. Though not limited thereto, examples of the preprocessing, the local filtering and the nonlocal filtering will be further described with reference to FIGS. 7, 9 and 10 below, respectively.

Figure 7:
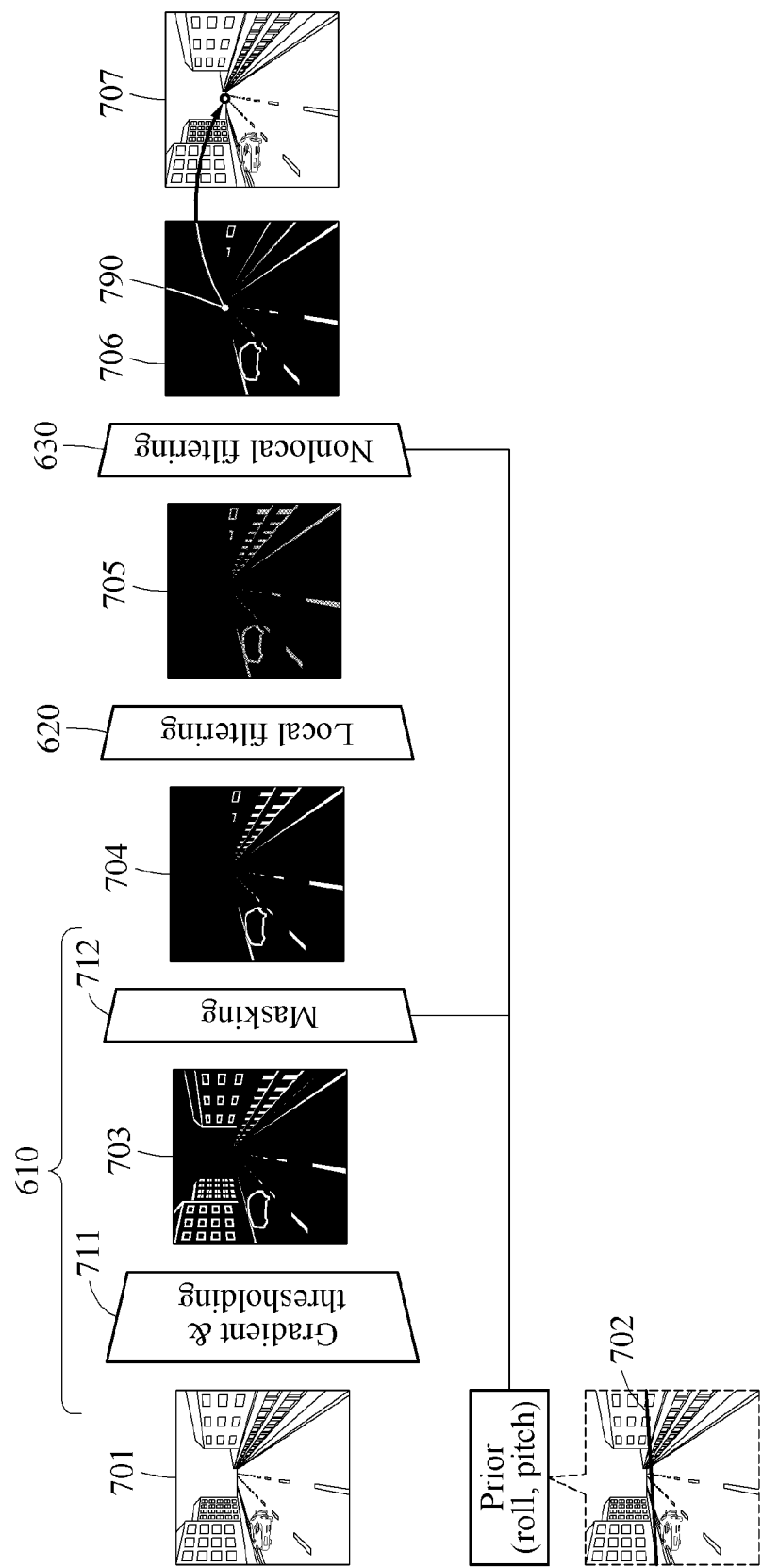
FIG. 7 illustrates an example of a preprocessing operation in a location estimation process.

FIG. 7 illustrates an example of a preprocessing operation in a location estimation process.

Referring to FIG. 7, a location estimation apparatus (e.g., the location estimation apparatus 100), according to an example embodiment, acquires an input image 701. For example, the location estimation apparatus may be mounted on a vehicle and may include a camera sensor installed to have an angle of field to show a front view of the vehicle. The camera sensor may capture a scene corresponding to the angle of field and acquire the input image 701.

As illustrated in FIG. 7, operation 610 in FIG. may include operations 711 and 712. In operation 610 of FIG. 6, the location estimation apparatus extracts a plurality of edge component pixels by preprocessing the input image 701. For example, as shown in FIG. 7, in operation 711, the location estimation apparatus calculates gradient information for each pixel from the input image 701. The gradient information is a value indicating an intensity change or a directional change of a color, for example. Gradient information at an arbitrary point in an image may be expressed as a 2D vector with differential values in a vertical direction and a horizontal direction. The location estimation apparatus may calculate a gradient value of a horizontal direction suitable for an estimation of a lane boundary line. The calculated gradient value may be a predetermined width value regardless of a width of a lane boundary line.

The location estimation apparatus extracts an edge component pixel having calculated gradient information exceeding a pre-defined threshold among pixels included in the input image 701. For example, the location estimation apparatus calculates a magnitude of a gradient vector (for example, the 2D vector with the differential values) as gradient information of each of the pixels in the input image 701, and determines a pixel having a gradient vector exceeding the threshold as an edge component pixel. Thus, the location estimation apparatus may extract, as an edge component pixel, a pixel of which an intensity value or a color value is rapidly changed in comparison to a neighboring pixel. An image including a plurality of edge component pixels is an edge component image 703.

In operation 712, the location estimation apparatus masks a portion of the plurality of edge component pixels. For example, the location estimation apparatus may exclude a pixel on a boundary from among the plurality of edge component pixels. The location estimation apparatus may exclude pixels corresponding to an area above a virtual horizontal line 702 in the input image 701. Thus, the location estimation apparatus may acquire information focused on a road area. The virtual horizontal line 702 will be further described with reference to FIG. 8 below. Although the virtual horizontal line 702 is illustrated as a boundary in FIG. 7, the disclosure is not limited to this example.

The plurality of edge component pixels extracted in operation 711 may indicate a lane boundary line, and a line along a lane, for example, a curb, or may indicate a line unrelated to the lane, for example, an outline of a building around a road. Since a rotation reference point 790, as a vanishing point, is a point to which lines (for example, lane boundary lines) along a lane converge in an image, a line perpendicular to a road, such as an outline of a building, may be less relevant to the vanishing point. Thus, the location estimation apparatus may remove pixels having no determined or estimated relevance, or selectively chosen lessened relevance, to the vanishing point by excluding edge component pixels above the road area in operation 712, as described above. An image from which pixels corresponding to such an area above the road area are removed is a masked image 704.

The location estimation apparatus generates an edge direction image 705 through the local filtering in operation 620, and generates an inlier image 706 through the nonlocal filtering in operation 630. The location estimation apparatus estimates the rotation reference point 790 from the inlier image 706, and acquires a result 707 to which the rotation reference point 790 is mapped.

The above-described operations are not necessarily performed in an order as shown in the drawings, and may be performed in parallel or in a different order, unless otherwise described. In an example, the location estimation apparatus may calculate a virtual horizontal line while calculating a gradient value. In another example, the location estimation apparatus may extract an edge component pixel after performing masking based on a virtual horizontal line.

Figure 8:
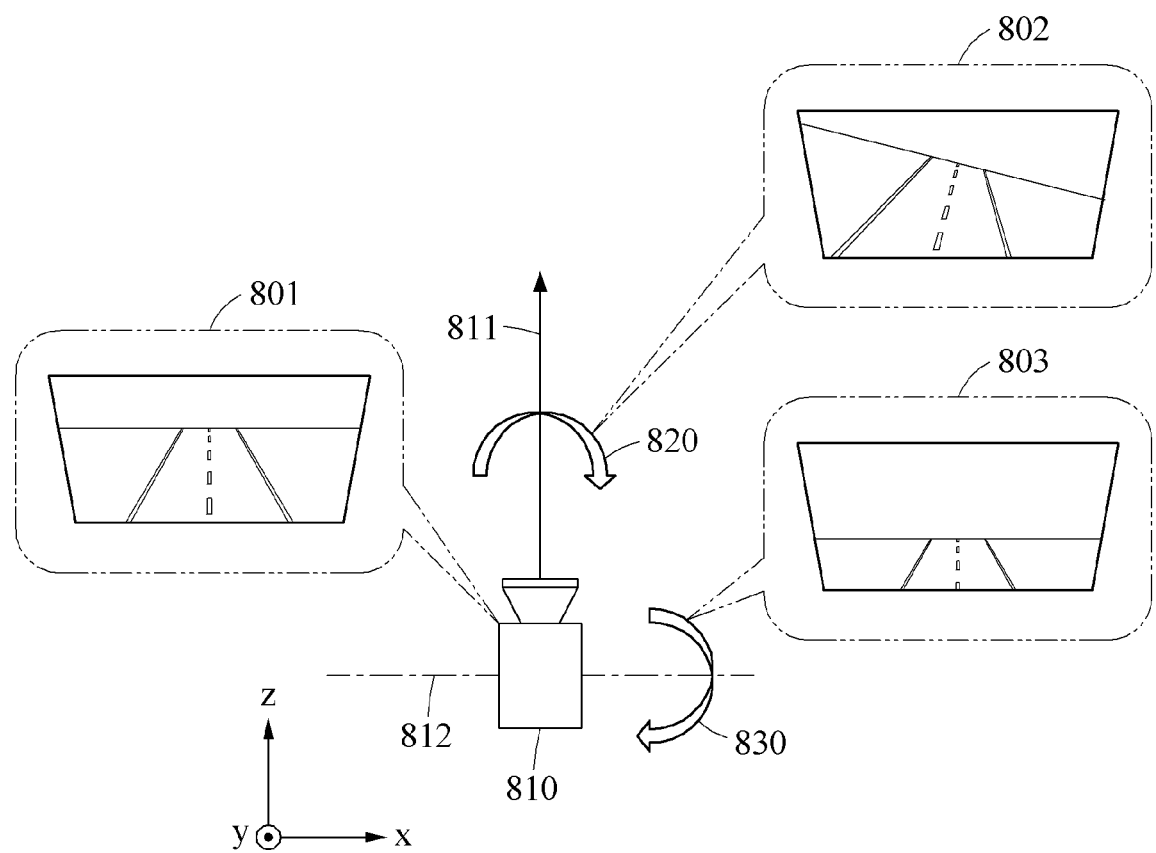
FIG. 8 illustrates an example of virtual horizontal line information.

FIG. 8 illustrates an example of virtual horizontal line information.

Referring to FIG. 8, the above-described virtual horizontal line information of FIG. 7 indicates a straight line in which a horizontal line is virtually present in an image captured by a camera sensor 810. The virtual horizontal line information may be prior information and may be determined in advance by a camera parameter (for example, camera calibration information). For example, the location estimation apparatus may determine a virtual horizontal line in an input image based on a roll parameter and a pitch parameter of the camera sensor 810 that captures the input image.

In FIG. 8, an x-axis and a z-axis are parallel to the ground, and a y-axis is defined as an axis perpendicular to the ground. In an image 801 captured when a central axis of the camera sensor 810 is parallel to the z-axis, the virtual horizontal line appears as a straight line crossing a central portion of the image 801 as shown in FIG. 8. The central axis of the camera sensor 810 may be referred to as an "optical axis." When the central axis of the camera sensor 810 is assumed to be parallel to the z-axis, a roll axis 811 and a pitch axis 812 of the camera sensor 810 may be the z-axis and the x-axis, respectively. A roll parameter of the camera sensor 810 may be determined by a roll rotation 820 and a pitch parameter of the camera sensor 810 may be determined by a pitch rotation 830. For example, the roll parameter may indicate an angle at which the camera sensor 810 is rotated about the roll axis 811 with respect to the ground, and the virtual horizontal line may appear as a straight line tilted by the roll parameter in an image 802. The pitch parameter may indicate an angle at which the camera sensor 810 is rotated about the pitch axis 812 with respect to the ground and the virtual horizontal line may appear as a straight line at a location vertically moved by the pitch parameter in an image 803.

Figure 9:
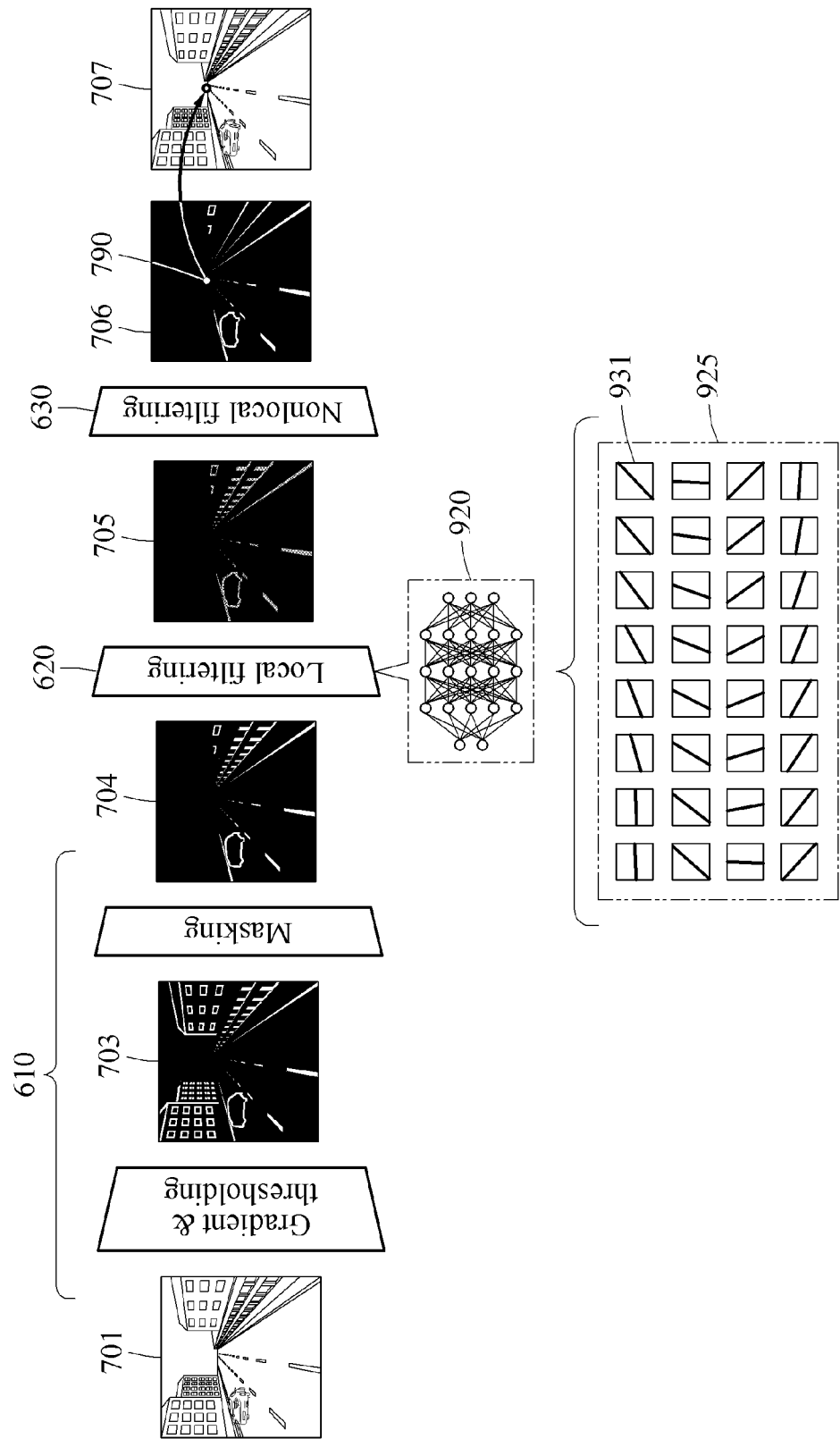
FIG. 9 illustrates an example of a local filtering.

FIG. 9 illustrates an example of a local filtering.

Referring to FIG. 9, the location estimation apparatus (e.g., the location estimation apparatus 100), according to an example embodiment, calculates edge direction information for each of a plurality of edge component pixels in the masked image 704 by performing the local filtering in operation 620 of FIG. 6. The edge direction information indicates an edge direction indicated by an edge component pixel, and represents a direction of an edge in an image. For example, the edge direction information may be distinguished by a value of an angle formed with an arbitrary reference axis (for example, a horizontal axis) in an input image, however, the disclosure is not limited to this example.

The location estimation apparatus determines an edge direction for each of the plurality of edge component pixels based on an edge direction estimation model. The edge direction estimation model is a model to output an edge direction of each edge component pixel from the edge component image 703, may have, for example, a machine learning structure, and may include, for example, a neural network. In FIG. 9, the example edge direction estimation model is implemented as a CNN 920 including a plurality of kernels 925. For example, the CNN 920 may include convolutional layers connected through the plurality of kernels 925. A neural network may extract an edge direction from an image by mapping input data and output data that are in a nonlinear relationship based on a deep learning. This example deep learning may be a machine learning scheme configured to solve an edge direction extraction problem from a big data set, and may be used to map input data and output data through supervised learning or unsupervised learning. Thus, the CNN 920 may be a network that is trained based on training data in advance to output edge direction information corresponding to each edge component pixel from each edge component pixel. Although the disclosure herein describes the CNN 920 and operations thereof for performing edge direction estimation, examples employing other types of neural networks and corresponding machine learning operations for performing the edge direction estimation are possible.

For example, the location estimation apparatus calculates a convolution operation value of each of the plurality of edge component pixels based on kernels for each preset angle in the CNN 920. Each of the plurality of kernels 925 may be a filter in which element values are disposed for extracting image information along or with respect to a predetermined edge direction through respective convolution operations and input information. For example, a kernel 931 among the plurality of kernels 925 may be a filter that includes element values configured to extract image information along or with respect to an edge direction at 45 degrees from a horizontal axis of an image. The location estimation apparatus may perform a convolution operation of a pixel at an arbitrary location and neighboring pixels in an image based on element values of a filter. For example, a convolution operation value of an arbitrary pixel calculated based on a kernel for extracting image information along or with respect to a predetermined edge direction (for example, a direction corresponding to 45 degrees) may be a value (for example, a probability value) indicating a possibility of the pixel being the predetermined edge direction.

The location estimation apparatus may calculate convolution operation values for each of pixels included in an image with respect to one kernel while sweeping each of the pixels. Also, the location estimation apparatus may calculate convolution operation values of the entire image for each of the plurality of kernels 925. For example, the edge component image 703 may be an image including two-hundred and fifty-six (256) horizontal pixels and two-hundred and fifty-six (256) vertical pixels, and the CNN 920 may include one-hundred and eighty (180) kernels. Although the 180 kernels are filters to extract edge directions corresponding to angular samples (for example, a 1 degree, 2 degrees, 179 degrees or 180 degrees) by 1 degree from 0 degrees to 180 degrees, an angle that may be extracted by a kernel is not limited to these examples. The location estimation apparatus may calculate a convolution operation value of each of the 256×256 pixels for each kernel. Also, the location estimation apparatus may calculate a convolution operation value of each of the 256×256 pixels for each of the 180 kernels. Thus, output data of the CNN 920 may include tensor data with a size of 256×256×180. In the described example, each element of the tensor data indicates edge probability information for 180 angular samples at a sample location of a 2D image with 256×256 pixels.

For example, a value indicated by tensor coordinates (x, y, θ) in the tensor data may be a value obtained by applying a kernel for extracting an edge direction of an angle θ to a pixel at coordinates (x, y) of the edge component image 703 through a convolution operation. Thus, when an edge direction of an angle indicated by the kernel at each 2D location of an image is detected, an element of the tensor data may be a non-zero value (for example, a probability of being a corresponding angle), and otherwise, may be a value of "0".

The location estimation apparatus determines, as edge direction information, an angle value indicated by a kernel corresponding to a highest convolution operation value among a plurality of convolution operation values calculated for each edge component pixel. As described above, each element value of tensor data may indicate a probability of a pixel at predetermined coordinates in an image being an edge direction of a predetermined angle. Thus, the highest convolution operation value among the plurality of convolution operation values calculated for each edge component pixel may correspond to a convolution operation value by a kernel with a highest probability of being an angle of a corresponding edge component pixel among a plurality of angles. Thus, the location estimation apparatus may estimate an edge direction with a highest possibility of being an angle of a corresponding edge component pixel for each edge component pixel.

Figure 10:
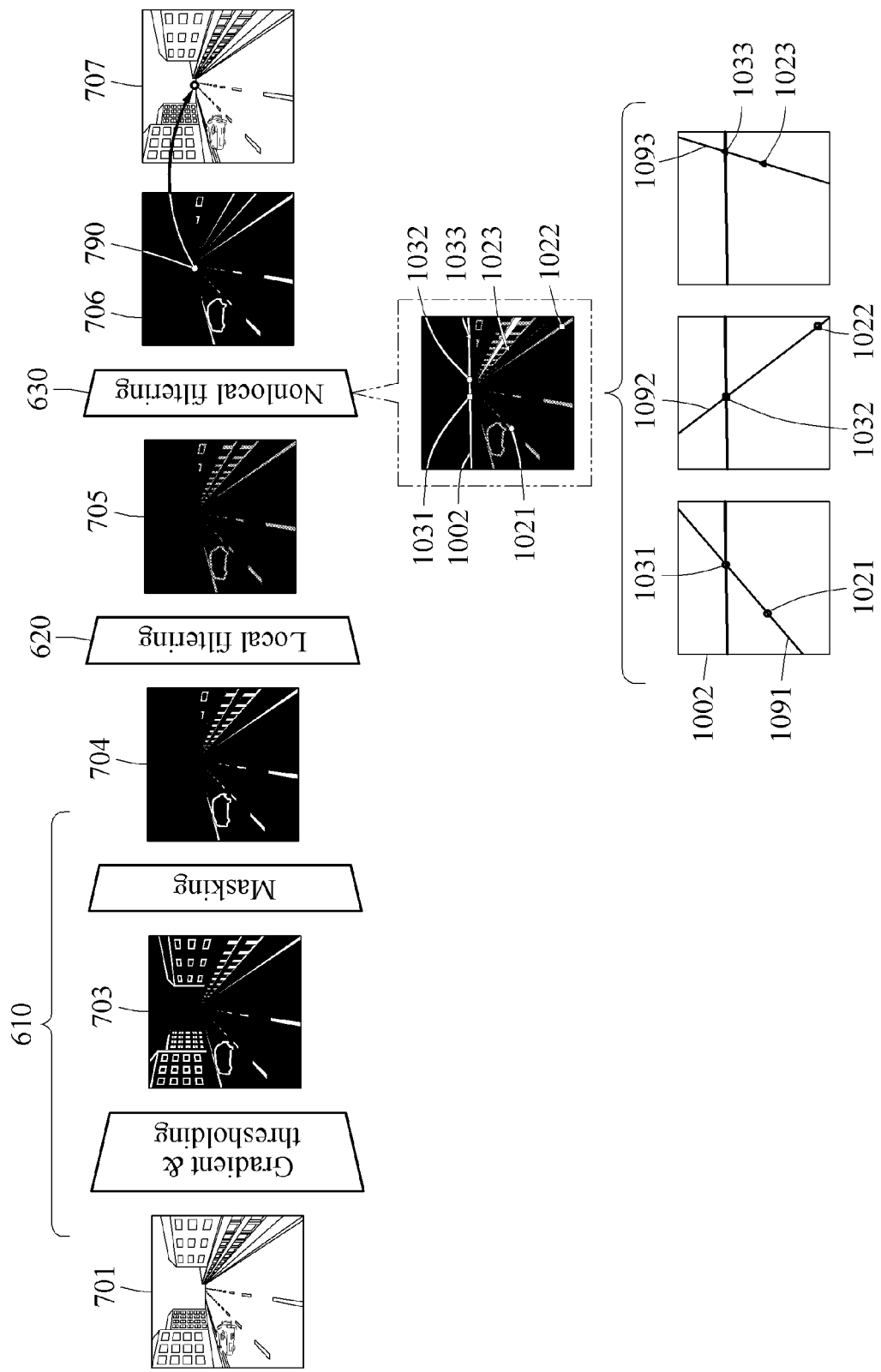
FIG. 10 illustrates an example of a nonlocal filtering.

FIG. 10 illustrates an example of a nonlocal filtering.

Referring to FIG. 10, the location estimation apparatus (e.g., the location estimation apparatus 100), according to an embodiment, determines an inlier pixel in the edge direction image 705 by performing the nonlocal filtering in the operation 630. For example, the location estimation apparatus may maintain an inlier pixel by removing an outlier pixel from the plurality of edge component pixels based on intersection points between a virtual horizontal line and edge lines corresponding to edge direction information of the plurality of edge component pixels. The location estimation apparatus may remove an outlier pixel based on an adjacency level between the intersection points. The adjacency level between the intersection points may be a degree by, or extent to, which the intersection points are adjacent to each other in the image, and may correspond to, for example, a determined and/or compared distance between the intersection points.

For example, in FIG. 10, a first straight line 1091 corresponding to an edge direction of a first edge component pixel 1021 and a virtual horizontal line 1002 may be determined to form a first intersection point 1031. A second straight line 1092 corresponding to an edge direction of a second edge component pixel 1022 and the virtual horizontal line 1002 may be determined to form a second intersection point 1032. A third straight line 1093 corresponding to an edge direction of a third edge component pixel 1023 and the virtual horizontal line 1002 form a third intersection point 1033. As shown in FIG. 10, the first edge component pixel 1021 and the second edge component pixel 1022 correspond to points on lane boundary lines of a road. The third edge component pixel 1023 corresponds to a point on a bridge rail. Locations at which the first intersection point 1031 and the second intersection point 1032 are detected are adjacent to each other, and the third intersection point 1033 is detected at a relatively far away location. Thus, the location estimation apparatus may exclude the third edge component pixel 1023, forming the third intersection point 1033, as an outlier pixel. The location estimation apparatus may maintain, as inlier pixels, the first edge component pixel 1021 forming the first intersection point 1031 and the second edge component pixel 1022 forming the second intersection point 1032.

An example of determining an inlier pixel and excluding an outlier pixel using an attention neural network is described in greater detail below with reference to FIG. 11.

Figure 11:
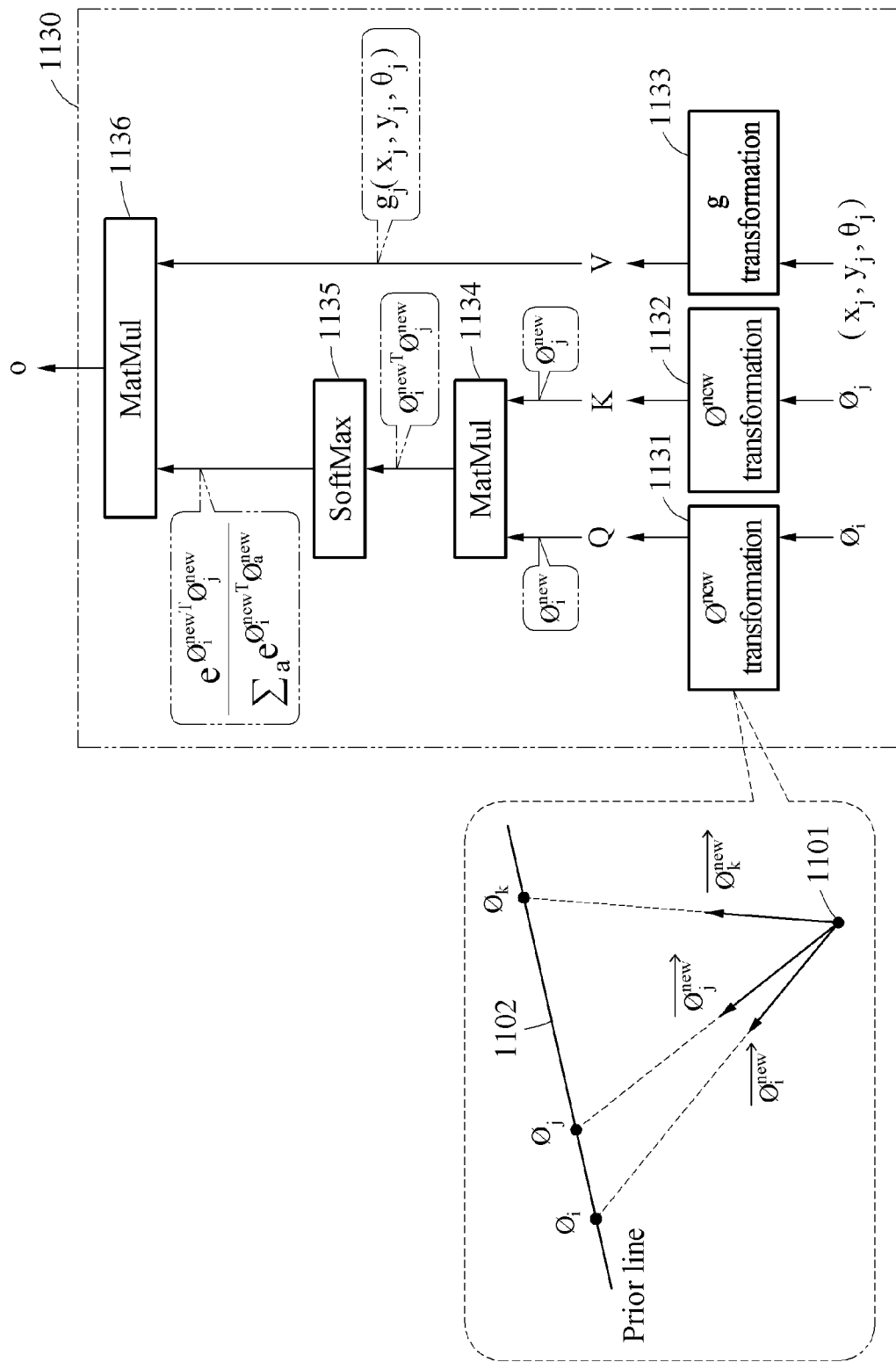
FIG. 11 illustrates an example of an attention neural network that excludes an outlier pixel.

FIG. 11 illustrates an example of an attention neural network 1130 that excludes an outlier pixel.

Referring to FIG. 11, a location estimation apparatus (e.g., the location estimation apparatus 100), according to an example embodiment, generates inlier data from which an outlier pixel is removed among a plurality of edge component pixels based on the attention neural network 1130. The attention neural network 1130 may be a network that is trained based on training data in advance to output an inlier pixel remaining by removing an outlier pixel from the plurality of edge component pixels.

For example, the location estimation apparatus may determine an inlier pixel among the plurality of edge component pixels based on a similarity between an intersection point formed by an individual edge component pixel and an intersection point formed by another individual edge component pixel.

The location estimation apparatus may calculate a reference vector from an intersection point between an edge line and a virtual horizontal line 1102 to a reference point 1101 on an input image through a first reference vector transformation 1131 and a second reference vector transformation 1132 for each of a plurality of edge component pixels. The reference point 1101 is designated as an arbitrary point on the input image. For example, a reference vector to express a similarity may be defined. As shown in FIG. 11, an intersection point between the virtual horizontal line 1102 and a straight line corresponding to an edge direction of each of the edge component pixels may be formed from each of the edge component pixels. A reference vector corresponding to an arbitrary edge component pixel may be a vector (for example, a unit vector) from the reference point 1101 to an intersection point between the virtual horizontal line 1102 and a straight line corresponding to an edge direction of each of the edge component pixels.

When a distance between intersection points corresponding to the plurality of edge component pixels decreases, a similarity between reference vectors corresponding to the plurality of edge component pixels increases. Thus, an inner product between the reference vectors may be implemented to determine the adjacency level of the intersection points. An intersection point between the virtual horizontal line 1102 and a straight line corresponding to an edge direction of an i-th edge component pixel is represented by $\phi_i$. A reference vector from the reference point 1101 to the intersection point $\phi_i$ corresponding to the i-th edge component pixel is represented by $\vec{\phi_i^{new}}$. In FIG. 11, i, j, and k are integers that are greater than or equal to "1". The location estimation apparatus may transform the intersection point $\phi_i$ corresponding to the i-th edge component pixel to an i-th reference vector $\vec{\phi_i^{new}}$ through the first reference vector transformation 1131. Also, the location estimation apparatus may transform an intersection point $\phi_j$ corresponding to a j-th edge component pixel to a j-th reference vector $\vec{\phi_j^{new}}$ through the second reference vector transformation 1132.

The location estimation apparatus calculates a similarity between reference vectors of the plurality of edge component pixels as an adjacency level between the intersection points. For example, the location estimation apparatus may input, to the attention neural network 1130, the i-th reference vector $\vec{\phi_i^{new}}$ as a query value and input the j-th reference vector $\vec{\phi_j^{new}}$ as a key value. The location estimation apparatus may calculate the similarity between the reference vectors to be an attention value as shown in Equation 1 below, through a matrix multiplication 1134.

$$a_j = A(q, k_j) = q^T k_j = \phi_i^{new^T} \phi_j^{new}$$ [Equation 1]

In Equation 1, $a_j$ is an inner product between a transposed vector of the i-th reference vector $\vec{\phi_i^{new}}$ and the j-th reference vector $\vec{\phi_j^{new}}$, and A( ) is an inner product operation. Also, q is a query value, and $k_j$ is a j-th key value. As described above, an inner product between reference vectors indicates the adjacency level between the intersection points, and accordingly $a_j$ is an adjacency level between the intersection point $\phi_i$ corresponding to the i-th edge component pixel and the intersection point $\phi_j$ corresponding to the j-th edge component pixel.

The location estimation apparatus may remove an outlier pixel by applying the calculated similarity to image coordinates of an edge component pixel and a vector value transformed from edge direction information. For example, the location estimation apparatus may apply an inner product value between reference vectors to a SoftMax operation 1135, to convert the similarity between the reference vectors to a weight based on Equations 2 and 3 shown below.

$$w_1, \ldots, w_n = \text{softmax}(a_1, \ldots, a_n)$$ [Equation 2]

$$w_j = \frac{e^{\phi_i^{new^T} \phi_j^{new}}}{\sum_a e^{\phi_i^{new^T} \phi_a^{new}}}$$ [Equation 3]

In Equation 2, n is an integer that is greater than or equal to "1," and is a number of intersection points, and weights $w_1$ to $w_n$ are softmax function results for attention values based on Equation 1. An individual weight is represented as shown in Equation 3. In Equation 3, a is indices indicating reference vectors and is an integer that is greater than or equal to "1". In Equation 3, e is Euler's number, $w_j$ is a weight corresponding to the adjacency level between the intersection point $\phi_i$ corresponding to the i-th edge component pixel and the intersection point $\phi_j$ corresponding to the j-th edge component pixel. The location estimation apparatus may acquire weight vectors of $[w_1, w_n]$ for all intersection points from Equation 3.

Also, the location estimation apparatus may acquire a vector value by transforming image coordinates of an edge component pixel and edge direction information. For example, the location estimation apparatus may generate value data $v_j=g_j(x_j,y_j,\theta_j)$ through a g transformation 1133 from the j-th edge component pixel. The location estimation apparatus may input a vector value $v_j$ generated through the g transformation 1133 to the attention neural network 1130.

The location estimation apparatus may perform a matrix multiplication 1136 between the vector value $v_j$ and the weight vector of Equation 3 and may generate an output value as shown in Equation 4 below.

$$o_i=\Sigma_{j=1}^{n} w_j g_j \qquad \text{[Equation 4]}$$

In Equation 4, $o_i$ is a value of an i-th edge component pixel. In an example, when an intersection point corresponding to the i-th edge component pixel is located far from intersection points corresponding to other edge component pixels, a value corresponding to the i-th edge component pixel may converge to "0", and accordingly an outlier pixel may be excluded. In another example, when the intersection point corresponding to the i-th edge component pixel is adjacent to the intersection points corresponding to the other edge component pixels, a value corresponding to the i-th edge component pixel may be a nonzero value due to its great weight, and thus an inlier pixel may be maintained. Thus, the location estimation apparatus may maintain an inlier pixel by excluding an outlier pixel from among the plurality of edge component pixels through the attention neural network 1130 and Equations 1 through 4.

As described above, the location estimation apparatus may determine edge component pixels that form intersection points with the virtual horizontal line 1102 that are adjacent to each other to be inlier pixels. The location estimation apparatus may estimate the rotation reference point 790 based on an inlier image including inlier pixels. For example, the location estimation apparatus may determine a point with a minimum distance to an edge line corresponding to an inlier pixel in the input image to be the rotation reference point 790. An edge line is a straight line passing through inlier pixels and may be, for example, a straight line having a slope corresponding to an edge direction indicated by inlier pixels. The location estimation apparatus may determine a point at which a distance between edge lines and a horizontal line is minimized to be the rotation reference point 790. However, determining of the rotation reference point 790 is not limited to the above description, and various schemes may be used to determine the rotation reference point 790. Although an example of directly estimating a rotation reference point from an inlier pixel has been described in FIG. 11, the disclosure is not limited to this example.

An example of performing a line fitting and estimating a rotation reference point is described below with reference to FIG. 12.

Figure 12:
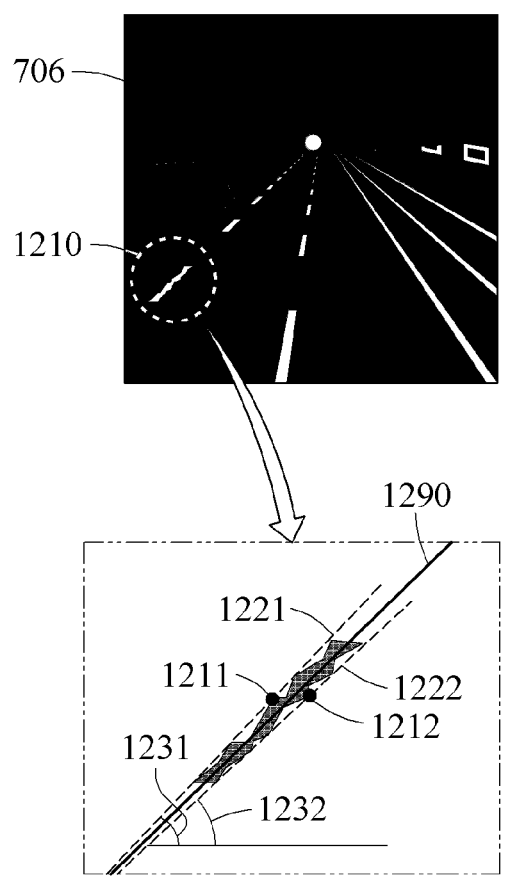
FIG. 12 illustrates an example of a line fitting.

FIG. 12 illustrates an example of a line fitting. A location estimation apparatus, according to an example embodiment (e.g., the location estimation apparatus 100), performs a line fitting on an inlier pixel among a plurality of edge component pixels. The location estimation apparatus clusters the plurality of edge component pixels into at least one straight line group and determines a representative edge line for each of the at least one straight line group, to perform the line fitting.

FIG. 12 illustrates a first edge component pixel 1211 and a second edge component pixel 1212 in a portion 1210 of an inlier image 706, according to an example. A first edge line 1221 by the first edge component pixel 1211 and a second edge line 1222 by the second edge component pixel 1212 form angles 1231 and 1232 that are different from each other with respect to an arbitrary reference axis. Since an edge direction of the first edge line 1221 and an edge direction of the second edge line 1222 are similar to each other, the location estimation apparatus clusters the first edge line 1221 and the second edge line 1222 into the same straight line group, and determines a representative edge line 1290 of the straight line group to which the first edge line 1221 and the second edge line 1222 belong. The representative edge line 1290 has an average edge direction of edge lines included in the straight line group, however, the disclosure is not limited to such an example.

For the above-described clustering, the location estimation apparatus converts an image including a plurality of inlier pixels to a bird's eye view image. Edge lines with similar edge directions among edge lines projected onto the bird's eye view image may be distinguished more clearly from each other than edge lines with different edge directions. The location estimation apparatus clusters the plurality of inlier pixels into at least one straight line group based on lines corresponding to the plurality of inlier pixels in the bird's eye view image. The location estimation apparatus determines an edge line representative of the at least one straight line group.

The location estimation apparatus estimates a rotation reference point based on an edge line obtained by the line fitting. For example, the location estimation apparatus may obtain representative edge lines for each individual straight line group by the line fitting, and determine a point having a minimized distance to the representative edge lines as a rotation reference point. An example of correcting localization information based on a rotation reference point determined by the method of FIGS. 1 through 12 is described below with reference to FIG. 13.

Figure 13:
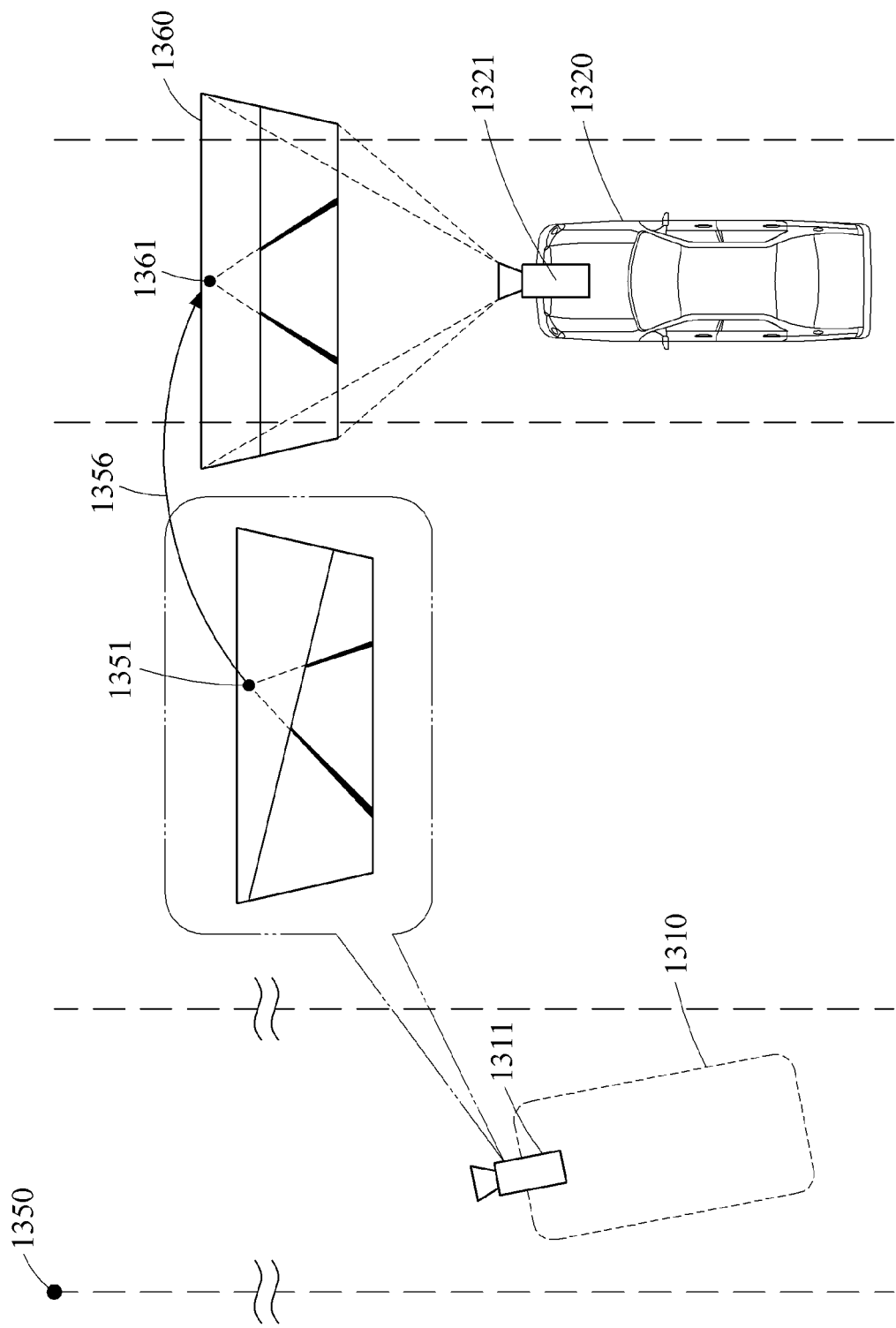
FIG. 13 illustrates an example of a rotation reference point error between initial localization information estimated for a location estimation apparatus and an actual pose of the location estimation apparatus.

FIG. 13 is a diagram illustrating an example of a rotation reference point error between initial localization information estimated for a location estimation apparatus and an actual pose of the location estimation apparatus.

In the example of FIG. 13, it is assumed that a target 1310 of a pose based on initial localization information is located obliquely with respect to a lane boundary. The pose of the target 1310 is virtually illustrated based on the initial localization information. A location estimation apparatus, which may be disposed on or in the target, for example, determines a point located beyond a threshold distance from the target 1310 among points defining a boundary line of a lane in which the target 1310 is travelling, to be an initial reference point 1350. When the initial reference point 1350 is projected onto an image plane corresponding to an angle of field of a sensor 1311 attached to the target 1310 in the pose based on the initial localization information, a point 1351 to which the initial reference point 1350 is projected is indicated as shown in FIG. 13.

In the example of FIG. 13, unlike the initial localization information, an actual target 1320 is oriented parallel to the lane boundary. A sensor 1321 of the actual target 1320 captures a front-view image from the actual target 1320. The location estimation apparatus detects a rotation reference point 1361 from image data 1360 as described with reference to FIGS. 1 through 12.

As described above, due to an error in the initial localization information, a point to which the initial reference point 1350 is projected directly on the image plane and the rotation reference point 1361 may appear at different points. Thus, a difference 1156 between the point to which the initial reference point 1350 is projected on the image plane and the rotation reference point 1361 may correspond to the error, for example, a rotation error and a location error, in the initial localization information.

By using a rotation parameter for correcting a localization error, the location estimation apparatus may correct the initial localization information. The location estimation apparatus may generate final localization information of the location estimation apparatus by correcting at least one of the location error and the rotation error in the localization information based on a rotation reference point.

Figure 14:
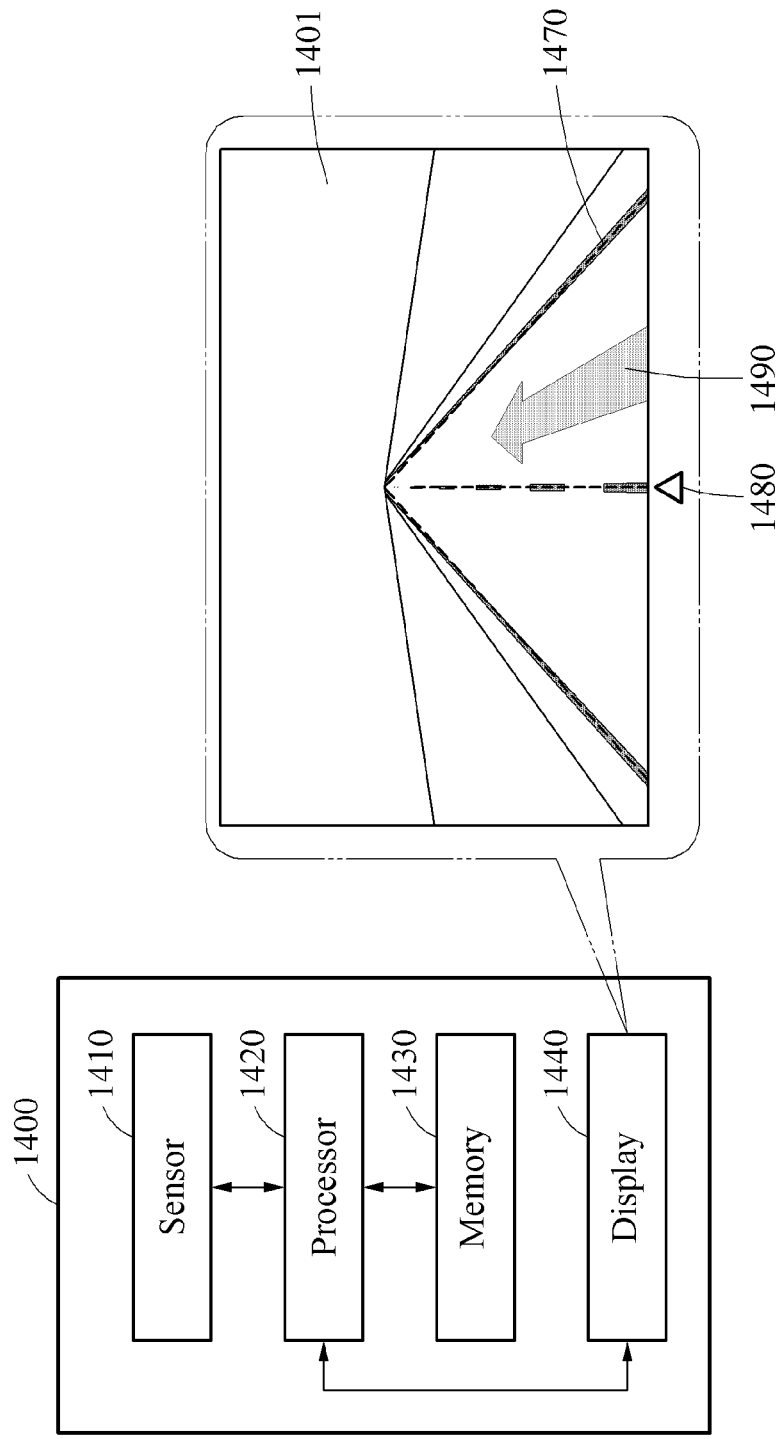
FIG. 14 illustrates an example of an operation of a location estimation apparatus mounted on a vehicle.

FIG. 14 illustrates an example of an operation of a location estimation apparatus 1400, according to an embodiment, mounted on a vehicle.

Referring to FIG. 14, the location estimation apparatus 1400 includes, for example, a sensor 1410, a processor 1420, a memory 1430 and a display 1440.

The sensor 1410 acquires an input image. The sensor 1410 may be a camera sensor 1410 configured to capture an external scene 1401. The camera sensor 1410 generates a color image as an input image. The color image includes an image corresponding to each of a red channel, a blue channel and a green channel, however, a color space is not limited to an RGB color space. The camera sensor 1410 is located to capture an outside environment of the location estimation apparatus 1400.

The processor 1420 calculates edge direction information of a plurality of edge component pixels extracted from the input image, determines an inlier pixel among the plurality of edge component pixels based on edge direction information and virtual horizontal line information, estimates a rotation reference point based on the inlier pixel, and corrects localization information of the location estimation apparatus 1400 based on the estimated rotation reference point.

The memory 1430 temporarily or permanently stores data required to perform a location estimation method.

The display 1440 performs a visualization by mapping a virtual content object 1490 to coordinates of the display 1440 determined based on final localization information of the location estimation apparatus 1400. The display 1440 transfers the external scene 1401 to a user. For example, the display 1440 may provide the user with the external scene 1401 captured by the camera sensor 1410. However, the disclosure is not limited to such an example. In an example, the display 1440 may be implemented as a transparent display 1440 to transfer the external scene 1401 to the user by allowing the external scene 1401 to be seen through the transparent display 1440. In another example, when the location estimation apparatus 1400 is mounted on a vehicle, the transparent display 1440 may be combined with a windshield glass of the vehicle.

The processor 1420 corrects initial localization information of the location estimation apparatus 1400 based on the rotation reference point and generates the final localization information of the location estimation apparatus 1400. Thus, the processor 1420 may match an estimated location to an actual location 1480 of the location estimation apparatus 1400. For example, the location estimation apparatus 1400 may control an operation of an apparatus based on localization information corrected based on the rotation reference point.

For example, the processor 1420 may determine a location of the virtual content object 1490 on the display 1440 based on the final localization information of the location estimation apparatus 1400. For example, the display 1440 may perform a visualization by overlaying the virtual content object 1490 on the external scene 1401 as shown in FIG. 14. When the display 1440 visualizes the external scene 1401 captured by the camera sensor 1410, the processor 1420 may perform a visualization through the display 1440 by overlaying the virtual content object 1490 on the external scene 1401 that is rendered. When the display 1440 is implemented as a transparent display 1440, the processor 1420 may map a location of the virtual content object 1490 to actual physical location coordinates of the external scene 1401, and may visualize the virtual content object 1490 at a point on the display 1440 corresponding to the mapped location. The virtual content object 1490 may be, for example, an object that guides information associated with travelling of a vehicle, and may indicate a variety of information associated with a travelling direction and a direction indication (for example, a left turn point and a right turn point), a speed limit and a current speed of the vehicle.

For example, when the location estimation apparatus 1400 is included in a vehicle, the location estimation apparatus 1400 may control an operation of the vehicle based on the final localization information. The location estimation apparatus 1400 may determine, based on the final localization information, a lane on which the vehicle is located among a plurality of lanes defined by a lane boundary line 1470 on a road in which the vehicle is travelling, and may detect a distance between the location estimation apparatus 1400 and a neighboring obstacle (for example, a preceding object). The location estimation apparatus 1400 may control any one or any combination of an acceleration, a speed, and a steering of the vehicle based on the distance detected based on the final localization information. For example, when a distance between the location estimation apparatus 1400 and a preceding object decreases, the location estimation apparatus 1400 may reduce the speed of the vehicle. When the distance between the location estimation apparatus 1400 and the preceding object increases, the location estimation apparatus 1400 may increase the speed of the vehicle. Also, the location estimation apparatus 1400 may change the steering (for example, a right turn and/or a left turn) of the vehicle based on final localization information of the vehicle along a preset travel route.

An example of using a rotation reference point in a localization based on map data and a travelling image in an augmented reality (AR) environment has been described with reference to FIG. 14. However, the disclosure is not limited to an application to the AR in a travelling environment. For example, a rotation reference point estimation scheme according to examples to enhance a localization performance even in various environments, for example, an AR navigation during walking may be used.

For example, the location estimation apparatus may also enable an estimation performance for input data with a different feature from that of data used for training of a neural network. Thus, the location estimation apparatus may exhibit a rotation reference point estimation performance that is robust against various environments. For example, the location estimation apparatus may accurately estimate the rotation reference point regardless of a unique characteristic of a camera sensor, a characteristic according to a travelling area (for example, a city area or a country area), image characteristics of a travelling city and/or country, and an illuminance characteristic. This is because edge direction information used to estimate the rotation reference point is less affected by a characteristic of a camera sensor, an area or an illumination. The location estimation apparatus may estimate the rotation reference point from a single image instead of performing a separate operation of a motion vector. The above-described location estimation method may be implemented by, for example, software, a web service, and a chip (e.g., a processor and a memory).

Parameters of the machine learning modules, e.g., of any, any combinations, or all of the neural networks, are stored in one or more of the memories and are implemented by the reading and implementing of the read parameters by the one or more processors.

The, processors, the processors 120 and 1420, the sensors, the GPS receivers, the GNSS modules, the IMUs, the memories, and the memories 130 and 1430 in FIGS. 1 to 14 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method, comprising:
   calculating edge direction information of edge component pixels extracted from an input image;
   determining an inlier pixel among the edge component pixels based on the edge direction information and virtual horizontal line information;
   estimating a rotation reference point based on the inlier pixel; and
   correcting localization information of an apparatus based on the estimated rotation reference point.

2. The method of claim 1, wherein the calculating of the edge direction information comprises extracting the edge component pixels by preprocessing the input image.

3. The method of claim 2, wherein the extracting of the edge component pixels comprises:
   calculating gradient information for each pixel among pixels included in the input image; and
   extracting select pixels, among the pixels included in the input image, with gradient information exceeding a threshold, as the edge component pixels.

4. The method of claim 1, wherein the calculating of the edge direction information comprises masking a portion of the edge component pixels.

5. The method of claim 4, wherein the masking of the portion of the edge component pixels comprises excluding a pixel on a boundary from among the edge component pixels.

6. The method of claim 5, wherein the excluding of the pixel on the boundary comprises excluding a pixel corresponding to an area above a virtual horizontal line in the input image.

7. The method of claim 6, wherein the excluding of the pixel on the boundary further comprises determining the virtual horizontal line in the input image based on a roll parameter and a pitch parameter of a camera sensor that captures the input image.

8. The method of claim 1, wherein the calculating of the edge direction information comprises determining an edge direction of each of the edge component pixels based on an estimation of an edge direction.

9. The method of claim 8, wherein the determining of the edge direction comprises:
   calculating a convolution operation value of each of the edge component pixels using a convolutional neural network (CNN) that includes a respective kernel for each of predetermined angles; and
   determining an angle value for a kernel, of the respective kernels, corresponding to a highest convolution operation value among convolution operation values calculated for each of the edge component pixels to be the edge direction information.

10. The method of claim 1, wherein the determining of the inlier pixel comprises maintaining the inlier pixel by removing an outlier pixel among the edge component pixels based on intersection points between a virtual horizontal line and edge lines corresponding to the edge direction information of the edge component pixels.

11. The method of claim 10, wherein the maintaining of the inlier pixel comprises generating, based on an attention neural network, inlier data from which the outlier pixel is removed.

12. The method of claim 10, wherein the maintaining of the inlier pixel comprises removing the outlier pixel based on an adjacency level between the intersection points.

13. The method of claim 12, wherein the removing of the outlier pixel comprises:
   calculating, for each of the edge component pixels, a reference vector from an intersection point, among the intersection points, between an edge line, among the edge lines, and a virtual horizontal line to a reference point in the input image; and
   calculating a similarity between the reference vectors based on the adjacency level between the intersection points.

14. The method of claim 13, wherein the removing of the outlier pixel further comprises removing the outlier pixel by applying the calculated similarity to a vector value obtained by converting the edge direction information and image coordinates of an edge component pixel among the edge component pixels.

15. The method of claim 1, wherein the estimating of the rotation reference point comprises:
   performing a line fitting on the inlier pixel; and
   estimating the rotation reference point based on an edge line according to the line fitting.

16. The method of claim 15, wherein the performing of the line fitting comprises:
   converting an image including a plurality of inlier pixels to a bird's eye view image;
   clustering the plurality of inlier pixels into at least one straight line group based on lines corresponding to the plurality of inlier pixels in the bird's eye view image; and
   determining the edge line to be an edge line representative of each of the at least one straight line group.

17. The method of claim 1, wherein the estimating of the rotation reference point comprises determining a point with a minimum distance to an edge line corresponding to the inlier pixel in the input image to be the rotation reference point.

18. The method of claim 1, further comprising:
   performing a visualization by mapping a virtual content object to display coordinates determined based on final localization information of the apparatus in a display that transfers an external scene to a user,
   wherein the correcting of the localization information comprises correcting either one or both of a location error and a rotation error of the localization information based on the estimated rotation reference point, and generating the final localization information based on a result of the correcting of either one or both of the location error and the rotation error.

19. The method of claim 1, further comprising:
obtaining the localization information using a global navigation satellite system (GNSS) module and an inertial measurement unit (IMU); and
acquiring the input image using an image sensor.

20. A non-transitory computer-readable storage medium storing instructions that, when executed by a processor, cause the processor to perform the method of claim 1.

21. An apparatus, comprising:
a sensor configured to acquire an input image; and
a processor configured to:
calculate edge direction information of edge component pixels extracted from the input image;
determine an inlier pixel among the edge component pixels based on the edge direction information and virtual horizontal line information;
estimate a rotation reference point based on the inlier pixel; and
correct localization information of the apparatus based on the estimated rotation reference point.

22. The apparatus of claim 21, wherein the edge component pixels comprise select pixels, among the pixels included in the input image, determined to have gradient information exceeding a threshold.

23. The apparatus of claim 21, wherein the processor is further configured to mask a portion of the edge component pixels by excluding a pixel, among the edge component pixels, corresponding to an area above a virtual horizontal line in the input image.

24. The apparatus of claim 23, wherein the processor is further configured to determine the virtual horizontal line based on a roll parameter and a pitch parameter of the sensor.

25. The apparatus of claim 21, wherein the processor is further configured to calculate the edge direction information by:
implementing a neural network to perform convolution operations on each of the edge component pixels; and
determining, based on results of the convolution operations, an angle corresponding to each of the edge component pixels to be the edge direction information.

26. The apparatus of claim 21, wherein the processor is further configured to determine the inlier pixel by removing an outlier pixel among the edge component pixels based on an adjacency level between intersection points between a virtual horizontal line and edge lines corresponding to the edge direction information of the edge component pixels.

27. The apparatus of claim 26, wherein the removing of the outlier pixel comprises:
calculating, for each of the edge component pixels, a reference vector from an intersection point, among the intersection points, between an edge line, among the edge lines, and a virtual horizontal line to a reference point in the input image;
calculating a similarity between the reference vectors based on the adjacency level between the intersection points; and
removing the outlier pixel by applying the calculated similarity to a vector value obtained by converting the edge direction information and image coordinates of an edge component pixel among the edge component pixels.

28. The apparatus of claim 21, wherein the processor is further configured to determine the inlier pixel by removing an outlier pixel among the edge component pixels based on intersection points between a virtual horizontal line and edge lines corresponding to the edge direction information of the edge component pixels.

29. The apparatus of claim 21, wherein the processor is further configured to determine the inlier pixel by:
removing an outlier pixel among the edge component pixels based on intersection points between a virtual horizontal line and edge lines corresponding to the edge direction information of the edge component pixels; and
generating, based on an attention neural network, inlier data from which the outlier pixel is removed.

30. The apparatus of claim 21, wherein the processor is further configured to estimate the rotation reference point by:
performing a line fitting on the inlier pixel in a bird's eye view image based on the input image; and
estimating the rotation reference point based on an edge line according to the line fitting.

31. The apparatus of claim 21, wherein the processor is further configured to estimate the rotation reference point by determining a point with a minimum distance to an edge line corresponding to the inlier pixel in the input image to be the rotation reference point.

32. The apparatus of claim 21, wherein the processor is further configured to perform a visualization by mapping a virtual content object to display coordinates determined based on final localization information of the apparatus in a display that transfers an external scene to a user, and
wherein the processor is further configured to correct the localization information by correcting either one or both of a location error and a rotation error of the localization information based on the estimated rotation reference point, and generating the final localization information based on a result of the correcting of either one or both of the location error and the rotation error.

33. The apparatus of claim 21, wherein the processor is further configured to obtain the localization information from a global navigation satellite system (GNSS) module and an inertial measurement unit (IMU).

34. An augmented reality (AR) apparatus, comprising:
a display configured to provide a view of an external environment;
a sensor configured to acquire an input image; and
a processor configured to:
calculate edge direction information of edge component pixels extracted from the input image;
determine an inlier pixel among the edge component pixels based on the edge direction information and virtual horizontal line information;
estimate a rotation reference point based on the inlier pixel;
generate final localization information by correcting initial localization information of the apparatus based on the estimated rotation reference point; and
perform a visualization by mapping a virtual content object to coordinates of the display determined based on the final localization information.

35. The AR apparatus of claim 34, wherein the sensor comprises a global navigation satellite system (GNSS) module and an inertial measurement unit (IMU), and the initial localization information comprises location information and pose information obtained from the GNSS module and the IMU.

36. The AR apparatus of claim 35, wherein the processor is further configured to determine an initial rotation reference point based on map data and the initial localization information, and wherein the correcting of the initial localization information comprises applying a rotation parameter such that the initial rotation reference point matches the estimated rotation reference point.

37. The AR apparatus if claim 34, wherein the processor is further configured to calculate the edge direction information by:
   implementing a neural network to perform convolution operations on each of the edge component pixels; and
   determining, based on results of the convolution operations, an angle corresponding to each of the edge component pixels to be the edge direction information.

38. The AR apparatus if claim 34, wherein the processor is further configured to estimate the rotation reference point by determining a point with a minimum distance to an edge line corresponding to the inlier pixel in the input image to be the rotation reference point.

39. The AR apparatus of claim 34, wherein the processor is further configured to estimate the rotation reference point by:
   performing a line fitting on the inlier pixel in a bird's eye view image based on the input image; and
   estimating the rotation reference point based on an edge line according to the line fitting.

40. The AR apparatus of claim 34, wherein the processor is further configured to determine the inlier pixel by removing an outlier pixel among the edge component pixels based on an adjacency level between intersection points between a virtual horizontal line and edge lines corresponding to the edge direction information of the edge component pixels.

41. The AR apparatus of claim 34, wherein the processor is further configured to determine the inlier pixel by:
   removing an outlier pixel among the edge component pixels based on intersection points between a virtual horizontal line and edge lines corresponding to the edge direction information of the edge component pixels; and
   generating, based on an attention neural network, inlier data from which the outlier pixel is removed.

42. The AR apparatus of claim 34, wherein the display comprises a windshield of a vehicle.

* * * * *